(No Model.)
H. C. MOORE.
COMBINED CULTIVATOR AND POTATO DIGGER.
No. 365,844. Patented July 5, 1887.
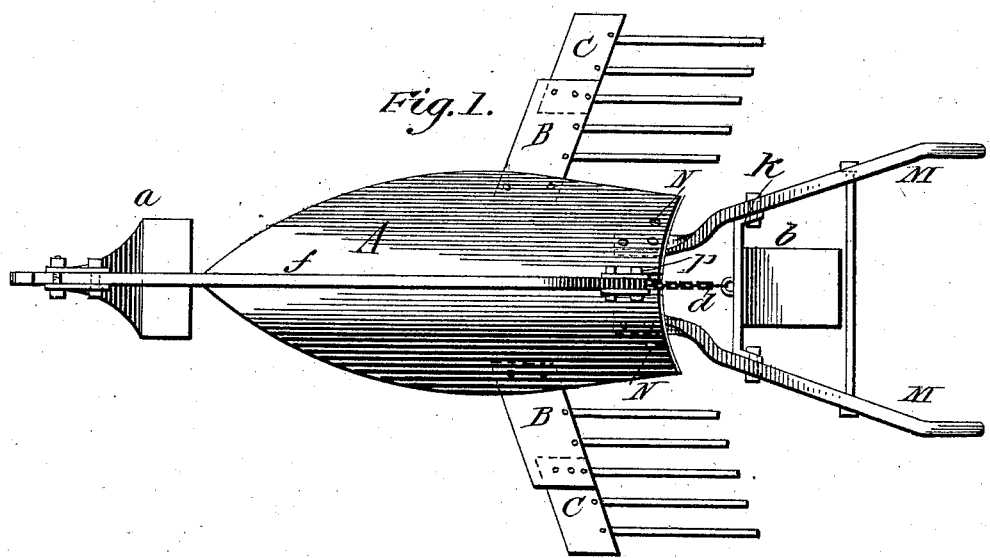
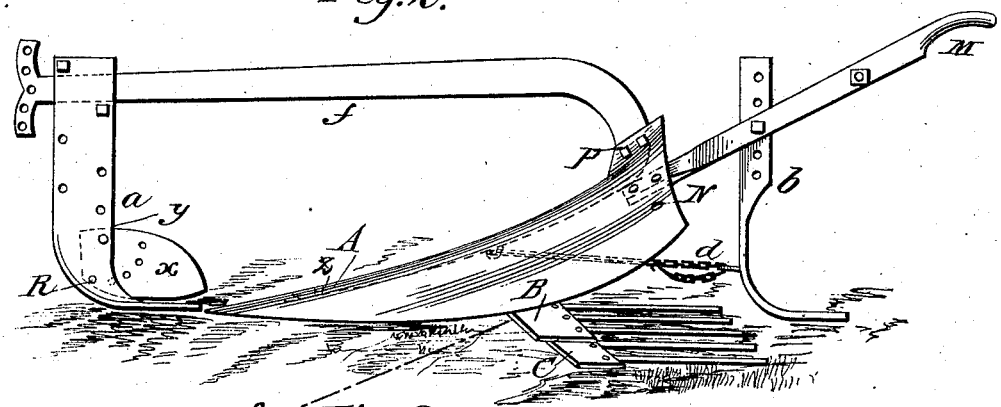
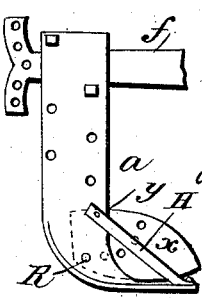
Witnesses.
J. W. Burton
R. M. Lyon
Inventor.
Henry Clarke Moore

UNITED STATES PATENT OFFICE.

HENRY CLARKE MOORE, OF TAMA CITY, IOWA.

COMBINED CULTIVATOR AND POTATO-DIGGER.

SPECIFICATION forming part of Letters Patent No. 365,844, dated July 5, 1887.

Application filed January 13, 1887. Serial No. 224,288. (No model.)

*To all whom it may concern:*

Be it known that I, HENRY CLARKE MOORE, a citizen of the United States, residing at Tama City, in the county of Tama and State of Iowa, have invented certain new and useful Improvements in Combined Cultivator, Potato-Digger, &c., of which the following is a description.

The design of my invention is to provide an implement adjustable to cleaning out weeds in the cultivation of tillage crops in rows of different width, to the cutting of trenches for putting in sugar-cane, to the making of garden and grain-field irrigating ditches, and for digging potatoes, and also to lighten the labor of handling plows and the draft of teams. These objects I attain by a flat-shaped shovel-plow made of a single plate of steel, the rear end of which is split, so that when pressed into shape the split end turns up in a partly-vertical position, the split part opening to admit the beam, which curves under, is bolted to, and sustains the point of the plow. Sufficiently back from the point of the plow for length thereof to cut trenches for sugar-cane, or to dig potatoes, are attached projecting flanges in sections for cultivating varying widths of rows. These flanges are provided with fingers to sift the earth from the weeds or potatoes. To the forward end of the beam is placed an adjustable gage, formed of two pieces of proper width to give steadiness of movement. These pieces are bent and twisted at the lower part into a sled shape, and between the two standards, above the slide, an adjustable colter is placed, pivoting on an upper bolt, and placed and held in position for the desired depth of cut by the lower bolt. To a cross-piece in the rear another adjustable gage is attached.

For cleaning out weeds the gages are set to give the desired depth of the cut.

For cutting trenches or digging potatoes, the front gage is raised and the rear one lowered. A chain at the bottom of the plow attaches at the foot of the rear gage, adjustable by grab-hook to various lengths, by which the gage-standard is protected from bending.

For use on a common plow in hard ground, that breaks in long heavy clods, or on heavy railroad-plows, in similar or frozen ground, the front gage is placed with the back end immediately over the point of the plow. The earth being raised by the plow, as by a wedge, and the suction of the plow holding the gages firmly to the ground, breaks it into short clods that would otherwise rise in long ones, bracing themselves against the shoulder of the plow and beam, and throwing it out, thus relieving the plowman of a portion of the labor of governing the plow.

Letter A in Figure 1 is the plow-point and mold-boards, made of one piece of steel plate, cut open at the rear end to admit the beam *f*.

B B and C C are removable cultivators or weed-skimmers, to which rods or fingers are attached to sift the earth from the weeds.

Letter *f* is the beam.

Letter *a* is the front gage attached to the beam by two bolts. By change of these bolts the depth of cut is regulated.

Letter *b* is the rear gage.

Letter *k* is a cross-bar and collar, between which the upright of gage *b* is placed. The upright, having holes at suitable distances, is adjustable by change of the bolt passing through the cross-bar and collar *k* to a different hole in the upright of the gage *b*.

The handles M M are bolted to the inside of the plow-plate, and are adjustable to position for ditching by changing the bolt and the handle to the hole at N.

In Fig. 2 the bolts *p p* show the method of the attachment of the beam *f*, the steel plate being pressed into proper shape to receive the beam. At *z* the point of the beam is bolted to the bottom of the plow-point. At *o* the chain *d* is connected with the beam *f*, and passes from there rearward, connecting with a link near the bottom of the upright of gage *b*. Passing back from the link, it is by a grab-hook put at such place on the chain as will prevent the upright from bending when the team is in motion.

Letter *a* shows position of front gage, with holes in the standard to adjust to different depths of cut.

Letter *x* is an adjustable colter pivoted between the standard-pieces at letter *y*, set at depth of cut desired by the bolt at R, operating between the two parts of the shoe or gage.

The dotted line S shows the angle of the plow in making a nine-inch cut with the cultivating attachments at the surface of the ground.

Letter H, Fig. 3, is a brace applied to the gage $a$, for use in work in frozen or stubborn soils. A corresponding brace is put upon the opposite piece, forming the other half of the gage.

I claim—

1. The combination, with the beam, of the front gage, formed of two plates or sections having their lower ends adapted to bear on the ground and their upper ends lapped on opposite sides of the beam, and the fastening-bolts, forming, in connection with said plates, a clip, substantially as set forth.

2. The combination of the beam or support, the gage formed of two plates or sections, and a cutter supported by and between said sections, substantially as set forth.

3. In combination with the adjustable front gage, $a$, and the colter $x$, the adjustable rear gage, $b$, and the supporting-chain $d$, as and for the purpose specified.

4. In combination with the adjustable gages $a$ and $b$, and the adjustable colter $x$, and the plow-plate A, the weed-skimming attachments B B and C C, as and for the purpose specified.

5. A plow or ditcher-shovel, substantially as described, formed from a plate of metal having its rear end slitted or cut, and having its portions on opposite sides of said slit or cut bent upward, forming a support for the attachment of the beam, substantially as set forth.

6. The combination, with the gage $a$, formed of two plates or sections, and the bolt R, of the colter $x$, pivoted between said sections at $y$, and having a plurality of openings, into any one of which the bolt R may be inserted, whereby to secure the colter in different adjustments, substantially as set forth.

HENRY CLARKE MOORE.

Witnesses:
HARRY AMBLER,
E. D. GOLDEN.